Jan. 29, 1963 D. A. WALES ET AL 3,075,653

APPARATUS FOR AND METHOD OF IDENTIFYING MATERIAL UNITS

Filed Dec. 12, 1958 3 Sheets-Sheet 1

INVENTORS
DONALD A. WALES
JOSEPH F. DUNDOVIC
EARL A. GRINDHEIM
BY Williamson, Schroeder & Palmatier
ATTORNEYS

APPARATUS FOR AND METHOD OF IDENTIFYING MATERIAL UNITS

Filed Dec. 12, 1958 3 Sheets-Sheet 2

INVENTORS
DONALD A. WALES
JOSEPH F. DUNDOVIC
EARL A. GRINDHEIM
BY Williamson, Schroeder & Palmatier
ATTORNEYS INVENTORS
DONALD A. WALES
JOSEPH F. DUNDOVIC
EARL A. GRINDHEIM
BY
Williamson, Schroeder, & Palmatier
ATTORNEYS

3,075,653
APPARATUS FOR AND METHOD OF IDENTIFYING MATERIAL UNITS

Donald A. Wales, Minneapolis, Joseph F. Dundovic, Brooklyn Center, and Earl A. Grindheim, Richfield, Minn., assignors to Maico Electronics, Inc., Minneapolis, Minn., a corporation of Minnesota
Filed Dec. 12, 1958, Ser. No. 779,916
12 Claims. (Cl. 214—11)

This invention relates to the method of and apparatus for magnetically identifying a succession of units of materials or material-carrying media, and more specifically for applying magnetic identification to such units and checking the identification of each unit in a succession of units and producing a predetermined result or response in relation to the positive identification of certain units.

In handling of units of materials or of material-carrying media, there are a good number of functions which must be carried out, some of which include sorting, classifying, routing, distributing, segregating, collecting, loading and unloading, inventorying, indexing, alarming or indicating, invoicing, recording, etc. In connection with these functions, all of which may be mechanically or automatically performed, the key to the performance of such functions at the proper time and at the proper place is the positive identification of the material unit.

An object of the invention is to provide new and improved identifying apparatus of relatively simple and inexpensive construction and operation for use in connection with a succession of material units for initiating performance of certain functions in relation to positive identification of certain units.

Another object of my invention is the provision of a novel material unit identifying apparatus wherein individual magnetic codings are applied to each of a succession of material units so as to facilitate sensing of the coding on each of the material units irrespective of any movement produced between the sensing devices and the material units as one passes along the other, and wherein indications are produced in response to certain sensed codings so as to facilitate initiation of performance of a desired function.

These and other objects and advantages of our invention will more fully appear from the following description made in connection with the accompanying drawings wherein like reference characters refer to the same or similar parts throughout the several views and in which.

Figures 1, 3, 4:
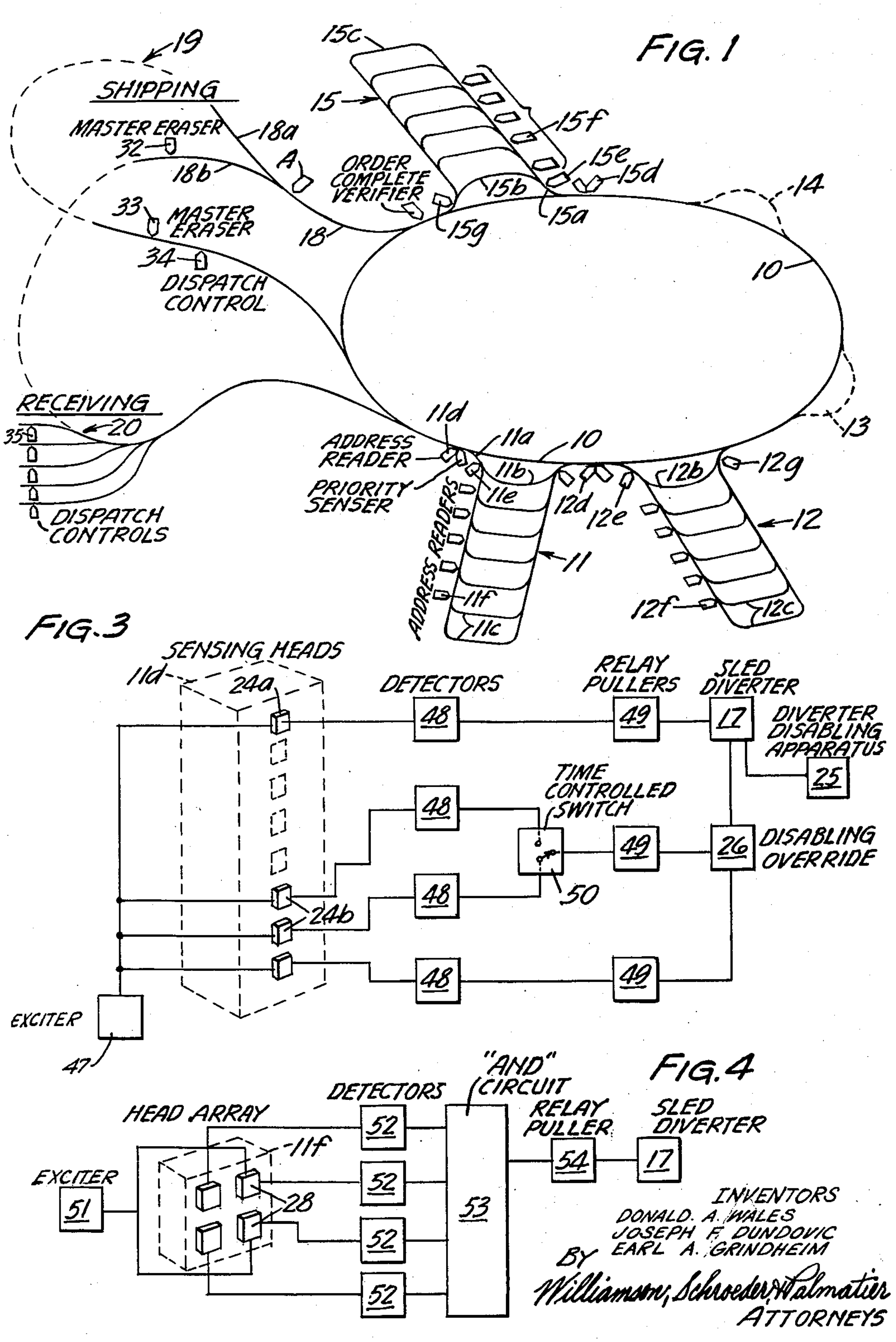
FIG. 1 is a general schematic view of a typical system employing the present invention.
FIG. 3 is a block diagram showing the general circuit components of one of the control sections of the system shown in FIGS. 1 and 2.
FIG. 4 is a block diagram showing the general circuit components of another of the control sections of the system shown in FIGS. 1 and 2.

The system shown in FIG. 1 is shown for illustrating a typical installation of the material-unit identifying apparatus for initiating a certain function in relation to the existence of a material-unit at a predetermined position. For clarity herein, it should be understood that the term "material-unit" is meant to include any type of a material, or a product or a quantity of materials or products which is segregated or is capable of being segregated from other similar or dissimilar materials or products. For instance, a material-unit might well comprise an individual electric motor or a can, or might comprise a number of motors segregated from other products and materials and packaged or stored together as a unit, or might comprise a plurality of cans packaged together. A material-unit might also comprise a quantity of granular material such as flour or seeds accumulated into a single container or accumulated into an area upon a belt conveyor.

The material-unit identifying apparatus will indicate the existence of the material-unit at a predetermined position or location, and in this regard, it will be noted that the material-units may be moving along a conveyor, or a number of units may be stored in a stationary condition. In the case of the material-units being moved along a conveyor, the identifying apparatus may employ stationary scanning mechanisms at certain points along the conveyor so as to initiate performance of certain functions when the material-units come abraast of a predetermined position. Where the material-unit is one of a number of units in storage or in stationary position the scanning mechanism may be moved successively along and into proximity with each of the material units to initiate performance of desired functions in relation to the existence of the material-units at their respective positions.

As hereinbefore suggested, the functions which are to be performed in relation to the material-units may consist in such functions as sorting, routing, segregating, inventorying, recording etc. These are typical functions desired in warehousing situations, but it is certainly contemplated that other functions such as those connected with manufacturing and the like are included within the scope of the "desired function" terminology employed herein. Many or most of these functions may be performed by machine or automatic mechanisms in which case such mechanisms or machines may be controlled by electric indications or signals. The receipt of such an indication or signal by the machine or mechanism will initiate the performance of the predetermined function. For instance when a stored material-unit is identified, the resulting indication or signal may operate a counting mechanism or may additionally feed an impulse into a business machine for accumulating inventory information. If the material-units are moving along a conveying mechanism, the indication of a material unit at a predetermined position may cause certain mechanism to divert the material-unit in one direction or another.

One important aspect of the present invention is in the application of magnetically actuated material-unit sensing apparatus for use in connection with a conveying media of the type which has at least some sidesway or transverse movement in conjunction with its normal longitudinal conveying movement. Conveyors of the type employed for carrying material-units can hardly have a truly linear movement in the direction of travel, but will substantially always have a limited amount of sidesway. According to the present invention, the material-unit-identifying apparatus provides magnetic devices on the conveyor media and also affixed to the stations along the conveyor, and regardless of the limited sidesway of the conveyor media and the corresponding variance in spacing between the magnetic devices on the conveyor media and at the fixed stations, the magnetic devices cooperate to cause proper identification of the material-units at certain stations in order to initiate performance of a desired function, such as one of those hereinbefore discussed.

As more fully discussed hereinafter, it will be seen that another important aspect of the present invention is the provision of magnetic devices positioned in coded arrays and at various positions with respect to the conveyor movement, so as to make possible a quick and positive identification of a material-unit existing at a certain position in order to initiate performance of a desired function. According to the present invention, certain of the magnetic devices of the material unit-identifying apparatus comprise magnetized areas which are sensed by other magnetic devices, and which are magnetized so that the magnetic poles are oriented with respect to each other in a direction transversely of the direction of travel, which orientation provides a factor, in addition to positioning of the magnetic fields with respect to each other, such as in arrays, for use in identification. An array includes magnetic fields which form more than one line or column and is generally associated with a binary system or a similar coding system as opposed to a spatial system, both of which will be more fully explained later.

With the foregoing in mind, reference is now made to the drawings and particularly to FIG. 1, which shows, diagrammatically, a somewhat typical warehousing situation employing a loop-type conveying medium or mechanism indicated by numeral 10, and traveling past a number of departments or stations which are indicated in general by numerals 11–15. The conveyor mechanism may employ a plurality of material-carrying sleds or other devices 16, moving primarily in the direction of arrow A (see FIGS. 2, 5, 6) which sleds in this illustration comprise the material-units, and which sleds will have at least a limited sidesway as indicated by the arrow B. By means of a known type of diverting mechanism 17 the sleds may be routed off the main conveyor loop and onto the conveyor sidings **11*a*, 12*a* . . . 15*a* at the corresponding stations. Diverting mechanism 17 may be of the type shown in the Wilcox patent, 2,833,391 or of the type found in the Muller patent, 2,825,476. The sidings may be divided into order pickup sidings or branches 11*b*, 12*b* . . . 15*b*, and a number of stock delivery or supply sidings 11*c*, 12*c* . . . 15*c*. The number of stock delivery sidings at the several stations may vary, according to the particular layout or nature of the stock handled in a particular department or station. The conveying medium or mechanism 10 may also include a siding 18 for directing the sleds to the shipping and receiving departments indicated in general by numerals 19 and 20. Of course the sleds carrying filled orders will be diverted to branch 18*a* of the siding 18 and the empty stock delivery sleds will be diverted to the branch 18*b***.

Figure 2:
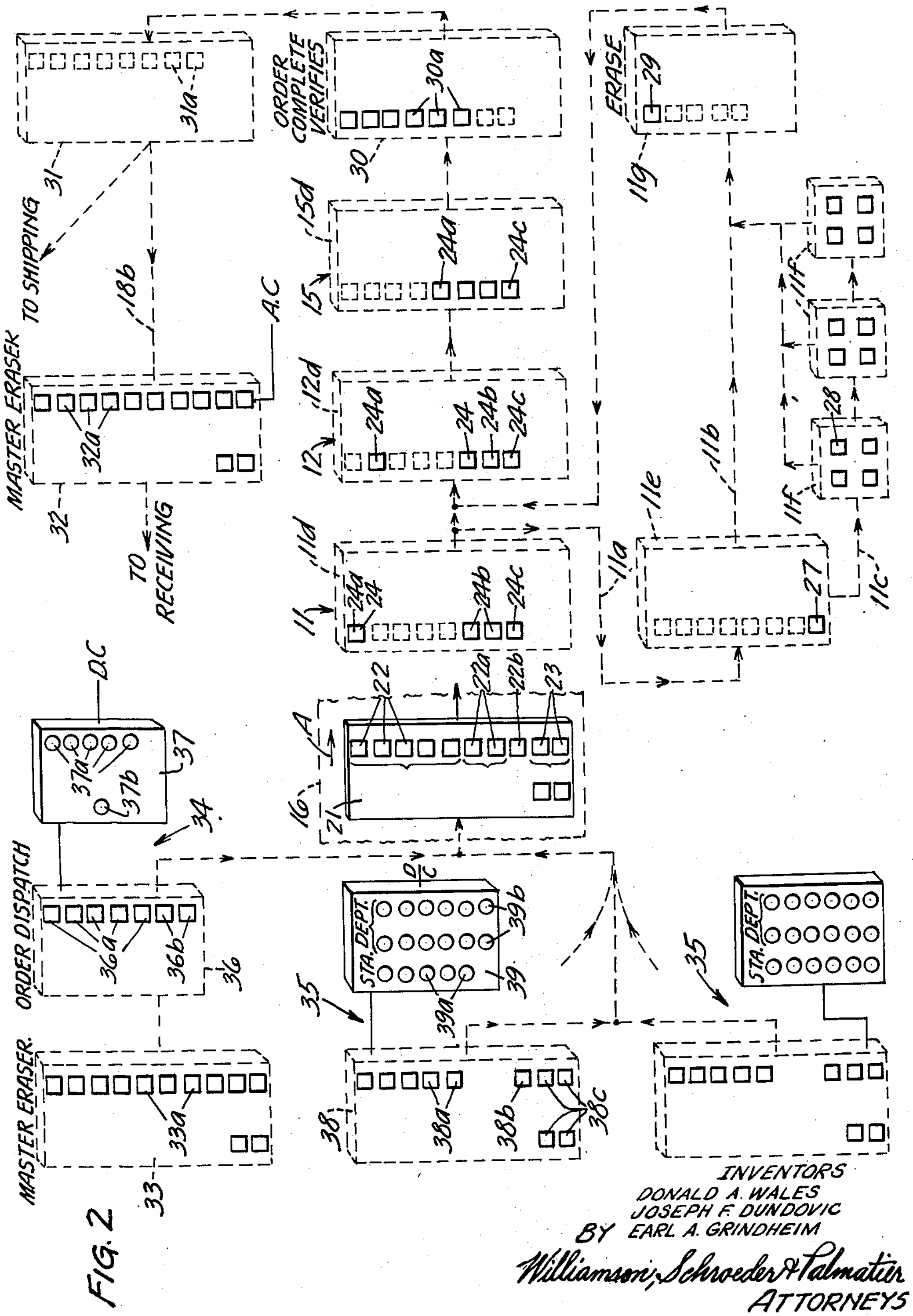
FIG. 2 is a diagrammatic view showing major portions of the system shown in FIG. 1.

With reference to FIG. 2, along with FIG. 1, each of the sleds 16 adapted for movement around the conveying medium 10 has a panel 21 secured to one side thereof. Means are provided on the panel to define a plurality of magnetized areas and in the form shown, such means includes a plurality of magnetizable metallic tabs or plates 22 arranged in predetermined orientation with respect to each other. The tabs 22 are oriented, along with the magnetizing means (hereinafter discussed) so that the magnetic north and south poles are oriented transversely of the direction of travel A. Certain of the tabs, as indicated at 23, are arranged in an array. The tabs 22 provide the sled with a magnetic coding indicating one or more addresses to which the sled is to be directed. It should be specifically noted that the magnetizable areas, provided by the tabs 22 in the illustrated form, might be provided by any of a number of other media such as carton-staples, glazers points, corrugated nails, iron cleats, banding straps, pulverant sprayed-on magnetic material, magnetic tape or the like. In any event a plurality of magnetizable areas are provided on each material-unit.

Address readers or magnetic sensing devices **11*d*, 12*d* . . . 15*d* are provided at each of the stations to sense the plurality of magnetized areas on each of the material-units to determine whether or not the material-unit or sled 16 should be diverted into the corresponding siding. Address readers 11*d*, 12*d*, etc. may be of the type shown and described in the co-pending application of Donald A. Wales, Ser. No. 780,723 filed December 16, 1958, now Patent 2,974,277 and assigned to the same assignee. The diversion of the sled is the function to be performed in response to the existence of a particular sled at a predetermined position. The address readers 11*d* . . . 15*d* each have a number of magnetic sensing heads 24 therein and are associated with other circuitry hereinafter more fully described. With regard to the address readers 11*d* . . . 15*d* it will be noted that each contains an address head 24*a* aligned with the line of travel of one of the tabs 22 on the slide 16. The address heads 24*a* are positioned at various vertical positions in the address readers 11*d* . . . 15*d*, and when a tab 22, having the same corresponding position as one of the heads 24*a* and also having a proper magnetic polarity, passes into confronting and magnetically coupled relation with an address head, the magnetic field of the magnetic tab is sensed and an indication is produced by the sensing head of the existence of the material-unit in front of the address reader. The indication is produced by means hereinafter more fully described, but it will be understood at this point that the indication produced by the head may initiate performance of the desired function which in the form illustrated consists in diversion of the sled onto the siding. In the operation of the magnetic sensing devices, the precise spacing between the tabs 22 and the heads 24*a*** is not critical, and the spacing is normally a nominal three-eighths to one-half inch. The limited sidesway of the sleds has not material effect on the reading of the coded addresses.

At this point it is well to note that although in the illustrated embodiment of the invention, the magnetizing areas or tabs 22 are mounted on the moving material-units and the address readers and sensing heads **24*a*** are stationary along the conveyor and mounted on a suitable supporting structure, the placement of the tabs and of the sensing heads could well be reversed, depending upon certain practical factors such as the nature of the function to be performed. For instance, if the material-units comprise granular material-carrying dump cars, it may be more practical to mount the sensing heads on the moving cars so as to start the operation of a dumping mechanism carried by the dumping car when the car reaches a predetermined position, such as over a hopper or bin.

In loop-type conveyor mechanisms such as that illustrated, it is frequently desired to limit the number of sleds in the order-filling sidings **11*b* . . . 15*b*, and in this regard, an apparatus 25 (FIG. 3) may be provided for disablinng the sled diverter so as to prevent sleds from being diverted into a particular siding even though the magnetic coding of the tabs indicates to the address reader that the sled should be diverted into the siding. Generally speaking it is desirous to have the sidings contain a lesser number of sleds than what they are capable of handling, say about half full. Apparatus 25** could take on many forms such as a switch, relay, etc. controlled by the number of sleds on the siding. However, regardless of this, it is necessary in such a system as that illustrated, to maintain a schedule within reasonable limits so as to prevent a sled from continuing to recirculate about the loop conveyor 10 if the sled should continuously meet with adverse routing situations at certain sidings. If a sled is dispatched during a certain hour, one of the priority tabs 22*a* on the panel 21 is energized, the corresponding priority sensing heads 24*b* are provided in each of the address readers 11*d*–15*d* so as to sense the tabs 22*a* to seek out sleds which were dispatched in the previous hour and if such sleds are detected, then to give such a sled priority and divert it into the siding regardless of whether the siding is more than half full. Since one of the tabs 22*a* will carry a code and the other will not, it may be said that magnetized tab 22*a* inherently retains a priority code upon being energized. The priority sensing heads 24*b* will operate a disabling override mechanism 26 so as to permit the sled diverter 17 to operate regardless of the influence of the disabling apparatus 25. The disabling override mechanism can take on different configurations and may also be in the form of a relay. This operation will be more fully explained later.

Likewise, because of the relatively greater capacity of the stock delivery and supply sidings 11*c*–15*c*, the disabling override mechanism 26 is also operated in response to indications produced by sensing heads 24*c* due to the passage of tabs 22*b* thereby which indicate that the particular sled is to be directed into the corresponding stock delivery or supply siding.

When the sled is diverted into the siding 11*a* the panel 21 will pass by another address reader such as 11*e* containing a sensing head 27. If the sensing head 27 detects that tab 22*b* is magnetized, the sled will be diverted to the stock delivery and supply sidings 11*c*, and if the tab 22*b* is not magnetized, then the sled will merely pass by the address reader 11*e* and, without being diverted, will pass into the order pickup siding 11*b*.

With regard to the foregoing examples of magnetized tabs and sensing heads, it will be noted that the production of an indication is related only to the position of a single tab and the position of a corresponding single sensing head. The tab is either magnetized or not magnetized and the sensing heads need only detect this condition and need not discriminate as to orientation of the magnetic poles of the magnetized tabs. This arrangement of magnetic coding and sensing may be referred to as a spatial system. Of course it may be desirable to cause the heads to discriminate between different magnetic field polarities, in which case, an additional variable factor is available to facilitate positive identification of material-units.

The discrimination of magnetic field polarities is employed in connection with the array 23 of tabs and the address readers 11*f* . . . 15*f* adjacent each of the stock delivery and supply sidings. The several tabs of the array 23 have magnetic fields which are oriented in predetermined relation to each other. The sensing heads 28 of the address readers 11*f*, along with their corresponding circuits, are responsive only to properly arranged tabs in the area 23 and wherein each of the tabs in the array has the proper orientation of magnetic field polarity. As the material-unit or sled 16 passes along the address readers 11*f*, the sled will be diverted into a siding only when a certain combination of magnetic field polarities are sensed. This is accomplished by circuit mechanism hereinafter more fully described.

In the illustrated embodiment the material-carrying sleds or material-units 16 are conveyed back to the main conveyor loop 10 after the loading or unloading has been accomplished in the appropriate siding and as the sled approaches the main conveyor loop, the panel 21 passes in close proximity with an address eraser 11*g* (or erasers 12*g* . . . 15*g* in the other sidings). The eraser 11*g* includes an erase head 29 which is positioned opposite the appropriate tab 22 which carried the address relating to the corresponding siding. Alternating current is applied to the head 29 so as to eliminate the magnetic field in the corresponding tab 22.

In the case of an order pickup sled, the sled may be diverted into one or more additional sidings, and as illustrated in FIG. 2, the sled will also be diverted into siding 15 to permit completion of the order for a particular customer.

When the sled leaves the siding 15, which is the fifth siding encountered after leaving the shipping or receiving departments the corresponding tab 22 (fifth from the top) will pass by the corresponding eraser so that none of the address tabs 22 which indicate the various stations are at that time polarized. The sled may then move by an apparatus 30 to verify completion of the filling of the order, or more specifically to verify whether or not it has stopped at appropriate sidings to which it had been dispatched. A plurality of sensing heads 30*a* are provided in the verifying apparatus 30, and if any of these heads senses a magnetic field on one of the address tabs 22, the sled is diverted back around the loop-conveying mechanism again. If none of the heads 30*a* senses a magnetic field, then the sled is directed onto the siding 18 which directs the sled to the shipping department 19. As the sled passes along the siding 18 the panel 21 passes by another address reader 31 to determine whether the sled, which has completed its travel past all of the stations, should be diverted to the shipping department 19 or to receiving 20. The sleds carrying the filled orders and having been in one or more of the sidings 11*b* . . . 15*b* must necessarily go to shipping and the other stock delivery or supply sleds will be returned to receiving department 20. The tabs 22*b* of certain sleds which have been previously used for delivering stock to sidings 11*c* . . . 15*c* will have a magnetic field and these tabs will cause production of an indication by the head 31*a* in the address reader 31 and cause these particular sleds to be diverted to receiving department 20. As the sleds pass along the branch 18*b* to the receiving department, the panel 21 passes by a master eraser 32 which contains a plurality of erase heads 32*a* each energized by A.C. current for eliminating the magnetic fields of particular polarities on the tabs on the panel 21. The sleds which were conveyed to shipping department 19 will pass by a similar master eraser 33 as they leave the shipping department. The erase heads 32*a* and 33*a* in the master erasers 32 and 33 are constructed generally similar to that shown in FIG. 9 with the exception that A.C. current is applied.

Means are provided for magnetically encoding the magnetizable areas or tabs 22 on each of the sleds as the sleds are again dispatched back to the main conveyor loop 10. The order pickup sleds may be controlled by a single dispatching station 34 and the stock supply and delivery sleds may be controlled by a number of dispatch stations 35, all of which are identical and are disposed at various feeder lines or sidings in the receiving department 20. The order pickup sled control station 34 has an address writer 36 including a plurality of addressing heads 36*a* for magnetizing certain of the tabs 22, depending upon the siding 11*a* . . . 15*a* into which the sled is to be diverted. It may be that the sled will only be diverted into one siding, but on the other hand, it may be necessary to divert the sled into a plurality of sidings. The address writer 36 also has a pair of sled priority control heads 36*b* for magnetizing one or the other of tabs 22*a* in accordance with the time at which the sled is dispatched. Operation of the address writer 36 is controlled at a control panel 37 having a plurality of push buttons 37*a* which individually control the respective address heads 36*a* and which also cause energization of one of the priority heads 36*b*, depending upon the position of the toggle switch 37*b*. During one hour the toggle switch 37*b* will be at one position causing one of the priority heads 36*b* to be energized in conjunction with the operation of one of the push buttons 37*a* and in the successive hour the toggle switch 37*b* will be flipped to its other position to cause energization of the other priority head 36*b* in conjunction with operation of the push buttons 37*a*. Of course it should be understood that automatic timing mechanism may be provided for controlling operation of the switch 37*b*.

Similarly, each of the dispatch stations 35 has an address writer 38 with a plurality of tab magnetizing address heads 38*a* which are controlled at the control panel 39 by the row of push button switches 39*a*. Operation of the push button switches 39*a* also causes the head 38*b* to be energized for magnetizing the corresponding tab 22*b* on the panel 21 to designate that the sled is being directed to one of the stock delivery or supply sidings 11*c* . . . 15*c*, and the sled thereby will gain immediate access to the siding as hereinbefore described. An array of tab magnetizing address heads 38*c* are provided for properly magnetizing the array 23 of tabs on the panel 21 to designate the exact stock delivery or supply siding into which the sled is to be ultimately diverted. The heads 38*c* are shown, diagrammatically, in FIG. 9 with a simplified circuit, and include the iron core 40*a*, windings 40*b* and 40*c* connected to be individually energized for magnetizing the core and the tab 22 with a predetermined magnetic pole orientation. If one of the coils is energized, the magnetic field imparted to the tab will have one polarity and if the other coil is energized the magnetic field imparted to the tab will have the opposite polarity. The entire array of heads 38*c* may be energized each with its proper polarity by any one push button 39*b* in the two rows of push buttons on the panel 39, depending upon the exact stock delivery and supply siding into which the sled is to be diverted and depending of course upon the code address of that particular siding.

Figure 5:
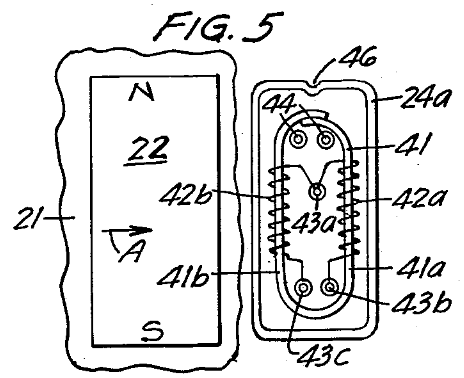
FIG. 5 is a somewhat diagrammatic elevation view showing one of the magnetic sensing heads in its relation to a magnetized tab moving into magnetically coupled relation with the head.
Figure 6:
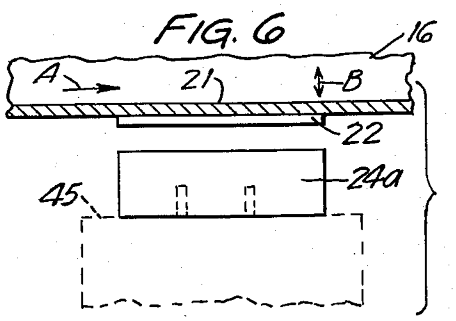
FIG. 6 is a somewhat diagrammatic detail plan view showing the relationship between the sensing head and magnetic tab when the tab is in magnetically coupled relation with the sensing head.

Refer now to FIGS. 5 and 6 which show, diagrammatically, one of the sensing heads, such as 24*a*. All of the heads employed in the address readers for sensing the magnetic coding carried by the tabs 22 and for producing indications in response to a sensed magnetic field, are identical with each other. The head includes a substantially continuous iron core 41 defining opposite legs or sides 41*a* and 41*b* upon which are respectively wound coils 42*a* and 42*b*. One end of each of the coils is connected with a common terminal 43*a*, and the other ends of the coils are connected individually with terminals 43*b* and 43*c*. In this particular embodiment, the terminals 43*a*, 43*b*, and 43*c*, as well as a pair of blank terminals 44, comprise the female parts of plug connections, and the male parts are carried on suitable panels 45 in the several address readers. This facilitates end-for-end reversal of the physical positioning of the heads in the address readers, and in the address readers, the circuit connections will remain the same in spite of the reverse physical positioning. Each of the heads is provided with a recess 46 or other readily perceptible means to clearly show the orientation of each head.

It is well to note here that there is a substantial spacing between the tabs 22 and the sensing heads in the address readers and no physical contact is necessary. It has been found successful in several situations to allow a spacing between the tabs and sensing heads of approximately three-eights to one-half inch.

Figure 7:
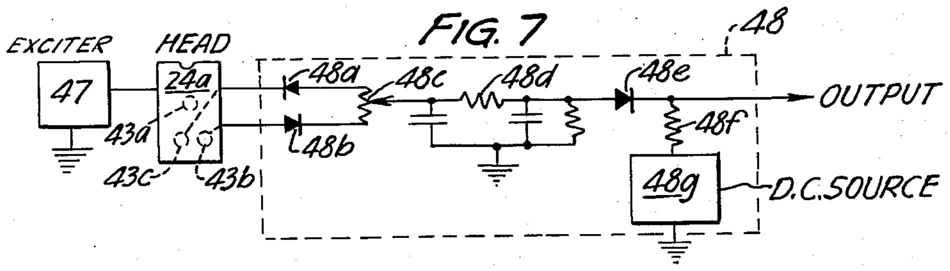
FIG. 7 is a typical schematic view of a portion of the circuit shown in FIG. 3.

With reference to FIGS. 3 and 7, which are related to one of the spatial address readers, it will be seen that each of the heads 24*a* is connected at its terminal 43*a* with an exciter or source of high frequency voltage 47 at a frequency of about fifteen kilocycles per second (which has been found satisfactory for use with a three-eighth to one-half inch spacing between sensing head and tab) and which may have an output voltage of twenty to thirty volts. The other terminals of the head are connected with a detector circuit 48, the output of which controls a relay puller circuit 49 for operating the sled diverter 17. Relay puller circuit 49 may take on many configurations such as a magnetic amplifier operating a relay, a transistor circuit in whch a relay is in the output, or a relay which is highly sensitive to an input signal. The general circuit connected with the priority indication sensing heads 24*b* is substantially the same except that a switching mechanism or priority timer 50 is provided for alternating connection of the outputs of the detectors to the relay puller, which in this case, operates the disabling override apparatus 26. Priority timer 50 may also be synchronized with any automatic timing mechanism used in conjunction with switch 37*b* mentioned earlier since the time periods would be the same.

The detector circuit 48 has a pair of oppositely connected diodes 48*a* and 48*b* which are respectively connected with the terminals 43*b* and 43*c* of the sensing head and are connected to the opposite ends of a potentiometer 48*c*. The wiper of the potentiometer 48*c* is connected with a D.C. filter circuit 48*d* and thence through diode 48*e* and a resistor 48*f* to a D.C. source of voltage 48*g* which may have an output voltage of approximately −26 volts. The output of the detector is connected between the diode 48*e* and the resistor 48*f*.

When a magnetized area or tab is moved into confronting and magnetically coupled relation with the head, conduction through the diodes 48*a* and 48*b* is unbalanced, and the voltage at the wiper of potentiometer 48*c* is changed. If the polarity of the magnetic field of tab 22 is correct, then the voltage at the output will vary in the proper direction to produce operation of the relay puller 49, and of course this will operate the sled diverter.

Figures 8, 9:
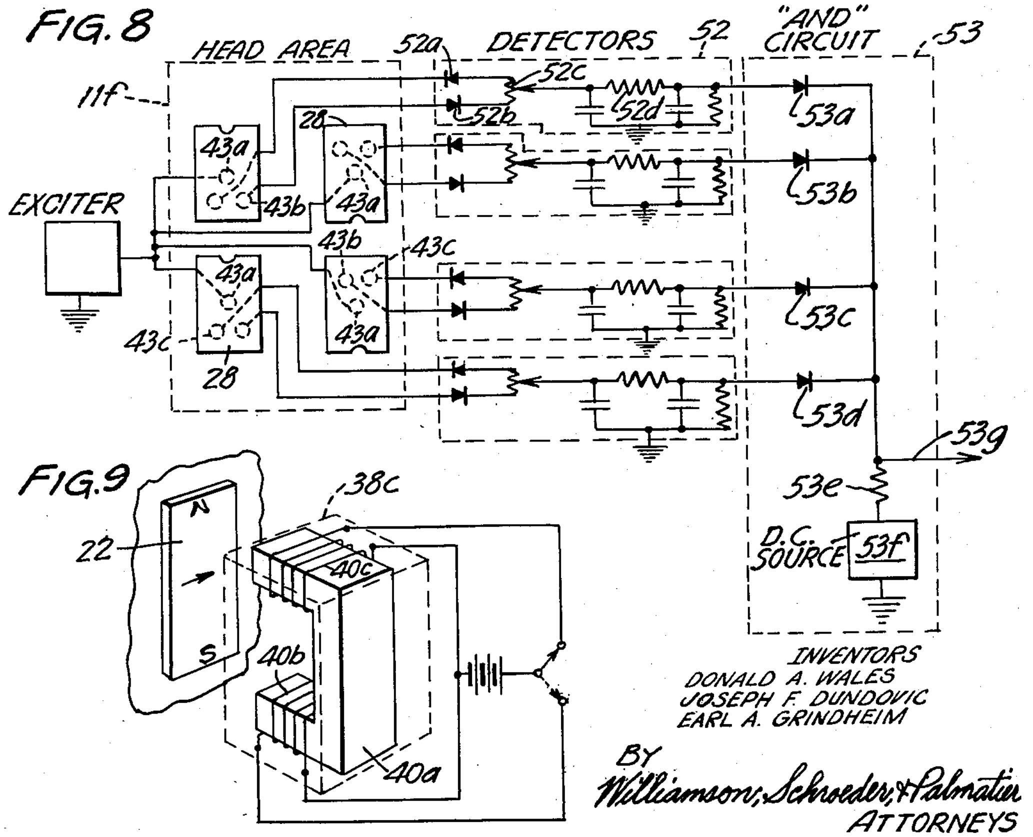
FIG. 8 is a schematic view of a portion of the circuit shown in FIG. 4.
FIG. 9 is a somewhat diagrammatic perspective view showing the relation between one of the magnetic tabs and a magnetizing device as a portion of the dispatching or address writing components of the system.

In connection with FIGS. 4 and 8, showing diagrammatically the operation of one of the binary address readers, each of the heads 28 is connected with an exciter 51 which may have an output of approximately fifteen kilocycles at approximately twenty to thirty volts, and each of the sensing heads is connected with a detector circuit 52. All of the detector circuits 52 are connected with an "and" circuit 53 requiring that each of the detector circuits 52 has a predetermined output in order to cause an output of the "and" circuit for operating the relay puller 54 which operates the sled diverter. Each of the detector circuits includes a pair of oppositely connected diodes 52*a* and 52*b* respectively, which are connected to the terminals 43*c* and 43*b* respectively of the corresponding head. The diodes 52*a* and 52*b* are also connected to the ends of a potentiometer 52*c*, the wiper of which is connected to a D.C. filter circuit 52*d*. The "and" circuit has a plurality of diodes 53*a*, 53*b*, 53*c* and 53*d*, each respectively connected with the output of the D.C. filter circuit of a corresponding detector circuit 52 and all of the diodes 53*a*–53*d* are connected through a resistor 53*e* to the source of D.C. voltage 53*f* which may have an output of −26 volts. The output from the "and" circuit 53 is taken between the diodes and the resistor 53*e*. When an array of magnetized tabs 23 are in confronting relation and predetermined position with the array of heads 28, so that each head is magnetically coupled with a corresponding tab, the diodes 52*a* and 52*b* of each detector circuit 52 have unbalanced conduction therethrough. If the magnetic polarities of each of the tabs is correct with reference to the physical orientation of the heads 28, the "and" circuit 53 produces an output signal at 53*g* for operating the relay puller 49 which of course operates the sled diverter 17. If the field polarity of any of the tabs does not correspond with the required field in order to produce the desired response from the detector circuit 48, then the "and" circuit will not produce the output signal necessary to operate the relay puller 17.

At this point it is well to note that in many situations, the binary system of material-unit identification as exemplified in FIG. 4 and the spatial system of material-unit identification as exemplified in FIG. 3, may be interchangeably used, with other practicalities in mind. If there are a relatively large number of positions or stations at which material-units must be identified, then the binary system of material-unit identification is preferable in many instances because only a relatively small number of sensing heads is necessary to obtain a relatively large number of combinations of coding for material unit identification. For instance, with an array of four tabs, there are sixteen combinations of coding which are possible. As applied to the disclosed embodiment in the drawings, any one or all of the stations or departments 11–15 could have up to 16 sidings 11*c*–15*c* and the array of four tabs 23 and four sensing heads 28 could facilitate the necessary identification. It is not necessary to put the sensing heads in a block pattern as shown in FIGURE 4 since they could be aligned in a straight line but the block pattern was used to illustrate the difference between the two systems because the "and" circuit 53 makes the difference in operation. However, it will be noted that the circuitry at each station is somewhat more complicated than that which is used with the spatial material-unit identification. When there are only a few stations or points at which the material-units are to be identified, such as the five stations of the loop conveyor 10, then the spatial system of material-unit identification may be more practical.

Within the concept of the present invention it should be noted that the material-units may be moving along a predetermined course and may carry the magnetized areas therewith, and the scanning mechanism or sensing heads will be stationary along the course of the moving material-units. On the alternative, material-units might be stationary as in a storage station and the scanning mechanism or sensing heads may be moved along the succession of stored material-units. Likewise, within the concepts of the present invention, the moving material-units might carry the scanning mechanism including the sensing heads so that the signals produced in response to the sensed magnetic field of stationary tabs adjacent the material units, could produce some desired function such as by dumping, by mechanism actually on or in close proximity to the moving material-unit.

It will, of course, be understood that various changes may be made in the form, details, arrangement and proportions of the parts without departing from the scope of my invention which consists of the matter shown and described herein and set forth in the appended claims.

What is claimed is:

1. Material-unit identifying apparatus facilitating performance of a desired function in relation to the existence of a material-unit at a predetermined position, said apparatus comprising:
(*a*) a conveying medium;
(*b*) a second medium;
(*c*) means producing movement of the conveying medium along the second medium, one of said media being adapted to support the material-units;
(*d*) magnetic means defining magnetized areas with the axis of each magnetic area defined by its poles parallel to that of all others, said means being supported by one of the media in predetermined relation to the material-units when the latter are so supported;
(*e*) a magnetic sensing means sensing the polarity of said magnetized area when the latter is disposed adjacent thereto and producing output signals in accordance therewith, said magnetic sensing means being supported by the other of the media and including an unbiased magnetic multi-polarity-sensitive sensing head capable of detecting two different polarities of said magnetized areas at any one time and producing output signals of predetermined magnitude representative of either polarity sensed, said sensing head being immovably positioned in spaced and confronting relation with said magnetized areas;
(*f*) alternating current excitation means operably connected to the sensing head of said sensing means;
(*g*) and selective circuit means producing a signal of predetermined magnitude sufficient to initiate the performance of the desired function to be performed, said circuit means being operably connected to said magnetic sensing head and responsive to said output signals from said sensing head.

2. Material-unit identifying apparatus facilitating performance of a desired function in relation to the existence of a material-unit at a predetermined position, said apparatus comprising:
(*a*) a conveying medium;
(*b*) a second medium;
(*c*) means producing movement of the conveying medium along the second medium, one of said media being adapted to support a plurality of the material-units;
(*d*) a plurality of first magnetic devices, each defining magnetized areas with the axis of each magnetic area defined by its poles parallel to that of all others, said plurality of first magnetic devices being supported by one of the media in predetermined relation to the material-units when the latter are so supported;
(*e*) a plurality of second devices each sensing the polarity of one of said magnetized areas when the latter are disposed adjacent thereto and producing output signals in accordance therewith, each of said plurality of second magnetic devices being supported by the other of the media and including an unbiased magnetic multi-polarity-sensitive sensing head capable of detecting two different polarities of said magnetized areas at any one time and producing output signals of predetermined magnitude representative of either polarity sensed, each of said sensing heads being immovably positioned in spaced and confronting relation with said magnetized areas;
(*f*) alternating current excitation means operably connected to the sensing head of each of said second magnetic devices;
(*g*) and a plurality of selective circuits each producing a signal of predetermined magnitude sufficient to initiate the performance of a desired function to be performed, one of said circuits being operably connected to each of said magnetic sensing heads and responsive to said output signals from said sensing head.

3. Material-unit identifying apparatus facilitating performance of a desired function in relation to the existence of a material-unit at a predetermined position, said apparatus comprising:
(*a*) a conveying medium;
(*b*) a second medium;
(*c*) means producing movement of the conveying medium along the second medium, said conveying media being adapted to support the material-units;
(*d*) a plurality of first magnetic devices including arrays of magnetized areas with the axis of each magnetic area defined by its poles parallel to that of all others, said plurality of first magnetic devices being carried by said conveying medium in predetermined relation to the material-units when the latter are so supported;
(*e*) a plurality of second magnetic devices sensing the polarity of said arrays of magnetized areas when the latter are disposed adjacent thereto and producing output signals in accordance therewith, each of said plurality of second magnetic devices being supported by the second medium and including an unbiased magnetic multi-polarity-sensitive sensing head capable of detecting two different polarities at any one time and producing output signals of predetermined magnitude representative of either polarity sensed, said sensing heads being immovably positioned in spaced and confronting relation with said arrays of magnetized areas;
(*f*) an alternating current excitator operably connected to the sensing heads of said plurality of second magnetic devices;

(g) a plurality of selective circuits each producing a signal of predetermined magnitude and each being operably connected to one of said magnetic sensing heads and responsive to said output signals from said sensing heads;

(h) and a binary "and" circuit producing a signal of predetermined magnitude sufficient to initiate the performance of the desired function to be performed, said binary "and" circuit operably connected to said plurality of selective circuits and responsive to said signals from said selective circuits.

4. Material-unit identifying apparatus facilitating performance of a desired function in relation to the existence of a material-unit at a predetermined position, said apparatus comprising:

(a) a conveying medium;

(b) a second medium;

(c) means producing movement of the conveying medium along the second medium;

(d) a plurality of material-units carried by the conveying medium;

(e) a plurality of first magnetic devices arranged in a row transverse to the direction of movement of said conveying medium for producing a magnetized area;

(f) a plurality of magnetizable elements defining magnetized areas with the axis of each magnetic area defined by its poles parallel to that of all others, said magnetizable elements being carried by said material-units in spaced and confronting relation to said first magnetic devices;

(g) a plurality of second magnetic devices each sensing the polarity of one of said magnetized areas when the latter is disposed adjacent thereto and producing output signals in accordance therewith, each of said plurality of second magnetic devices being supported by said second medium and including an unbiased magnetic multi-polarity-sensitive sensing head capable of detecting two different polarities of said magnetized areas at any one time and producing output signals of predetermined magnitude representative of either polarity sensed, each of said sensing heads being immovably positioned in spaced and confronting relation with said magnetized areas carried by said material-units on the conveying medium;

(h) alternating current excitation means operably connected to the sensing head of each of said plurality of second magnetic devices;

(i) a plurality of selective circuits each producing a signal of predetermined magnitude and each being operably connected to one of said magnetic sensing heads and responsive to said output signals from said sensing heads;

(j) and a plurality of diverters diverting said material-units from said conveying medium, each of said diverters positioned adjacent said conveying medium and being operably connected to one of said plurality of selective circuits and responsive to said signals from said selective circuits.

5. Material-unit identifying apparatus in combination with material-unit transporting apparatus for producing a predetermined result comprising; transporting apparatus for traveling over a predetermined route for receiving and discharging a plurality of material units; magnetizable material associated with each predetermined function to be performed and adapted to receive a code representative thereof, said material being located at a plurality of locations, all of which are substantially adjacent to said transporting apparatus; magnetic field producing apparatus for recording said code on each of said magnetizable materials; magnetic field detecting apparatus associated with said transporting apparatus for detecting said code on each of said magnetizable materials and producing a signal representative thereof; and control apparatus responsive to said output signal from said magnetic field detecting apparatus for controlling the functions of receiving and discharging said plurality of material units.

6. Material-unit identifying apparatus in combination with conveyor apparatus for producing a predetermined result comprising: an endless conveyor for receiving, discharging, and transporting material units over a main route and a plurality of secondary routes; magnetizable material associated with said material units responsive to a magnetic field for retaining a magnetically impressed code; first magnetic field detecting apparatus for reading said code recorded on said magnetizable material and producing an output signal when said code is detected; diverter apparatus responsive to said output signal from said first magnetic field detecting apparatus to divert said material units bearing said code from said main route to said secondary route; means including said conveyor apparatus for transporting said material units to said main route; second magnetic field detecting apparatus for reading said code recorded on said magnetizable material and producing an output signal representative thereof; disabling mechanism for predetermined disabling of said diverter apparatus and connected thereto, to prevent removal of said material units from said main route to one of said plurality of secondary routes; and disabling override apparatus responsive to said second magnetic field detecting apparatus to cause said diverter apparatus to divert said material units bearing said code detected by said second field detecting apparatus onto said secondary route.

7. Material-unit identifying apparatus in combination with conveyor apparatus for producing a predetermined result comprising: an endless route conveyor for carrying material units and being adapted to recirculate said units, said conveyor having a first station and having a plurality of second stations; each of said stations including diverting apparatus for removing the material units from the conveyor and also including a secondary conveyor for receiving the material units from the diverting apparatus and for carrying the material units back to the endless conveyor; each of said stations also having mechanism for disabling said diverting apparatus when desired; each material unit having a magnetically coded medium associated and moving therewith, the code having identifying characteristics related to the second stations for which the material unit is being directed; each of said second stations having a second magnetic field detecting apparatus for reading the magnetic code associated with each material unit moving on the conveyor and producing a first output signal when the proper identifying characteristic relating to the corresponding station is sensed; each of said second stations having means connected with said detecting apparatus for operating the diverting apparatus in response to an output signal so that a material unit is diverted from the endless conveyor at the proper station; each of said second stations including a code-modifying means along the secondary conveyor and producing a modified identifying characteristic unique with the particular station on said medium of each material unit; said first station having first magnetic field detecting apparatus for reading the magnetic code associated with each material unit, and producing a first output signal in response to a predetermined combination of identifying characteristics on the material unit; means connected with said first detecting apparatus and operating the diverting apparatus of said first station in response to a first output signal so that each material unit is diverted from the endless conveyor at said first station when the material unit has been diverted from the conveyor at each of the second stations to which it was directed, otherwise permitting said material unit to recirculate; and each of said detecting apparatus at each of said second stations being rendered inoperative for operating the corresponding diverting apparatus when a verifying signal from the corresponding station is detected on a material unit.

8. Material-unit identifying apparatus in combination with material-unit transporting apparatus for producing a predetermined result comprising: transporting apparatus having a primary and a plurality of secondary routes including devices for receiving and discharging a plurality of material units; magnetizable material associated with each of said material units for receiving and retaining a distinct magnetically impressed priority code; first switching apparatus having a plurality of input terminals and an output terminal responsive to predetermined conditions for switching said output terminal to one of said input terminals in accordance with said predetermined conditions; a plurality of magnetic field producing apparatus responsive to said first switching apparatus for recording said distinct code on said magnetizable material; a plurality of magnetic field detecting apparatus adjacent to said transporting apparatus for reading said code recorded on said magnetizable material and producing distinct output signals when said distinct code has been detected; second switching apparatus having a plurality of input terminals and an output terminal responsive to said predetermined conditions and connected to said plurality of magnetic field detecting apparatus for connecting said output terminal to receive one of said distinct output signals; diverter apparatus for diverting said material units bearing said distinct code from said primary route to one of said plurality of secondary routes; diverter disabling apparatus responsive to the number of material units on a secondary route and connected to said diverter apparatus to supply a signal for preventing said material units bearing said distinct code from being diverted from said primary route to said secondary routes; and override apparatus responsive to said output signal from said second switching apparatus and connected to said diverter apparatus to override said signal received by said diverter apparatus from said diverter disabling apparatus so that said material units are diverted when said predetermined conditions are satisfied.

9. In combination, an endless route-type conveyor for carrying material units to any of a plurality of stations along the conveyor and being adapted to recirculate the material units over the endless route; one station including apparatus for performing a predetermined function in response to the existence of the material unit at said station, a magnetically encoded medium connected with each material unit and moving therewith, the code having identifying characteristics related to the station at which the material unit is directed and the code also having priority characteristics related to the priority of the material unit as compared to the priority of other material units on the conveyor, said one station having a magnetic field detecting and uncoding mechanism adjacent the conveyor for reading the magnetic code connected with each material unit moving on the conveyor, said detecting mechanism producing a first output signal when the proper identifying characteristic relating to the corresponding station is sensed and also producing an indication relating to the priority characteristic of the corresponding material unit, and said one station having a priority scheduling mechanism receiving said indication and producing a priority output signal in response to an indication of predetermined priority; said one station having means connected with said detecting mechanism and operating said apparatus in response to a first output signal whereby to perform said predetermined function on said material unit to be diverted from the conveyor at the proper station; mechanism for disabling said apparatus when desired to prevent performance of said predetermined function at the particular station; and means receiving said priority output signal and connected with said apparatus to override the effect of said disabling mechanism in response to said priority output signal and thereby cause performance of said predetermined function upon the high priority material units at said one station.

10. Material-unit identifying apparatus in combination with conveyor apparatus for producing a predetermined result comprising: a conveyor system for receiving, discharging, and transporting material units over a main route and a first and second secondary route; metal tabs associated with said material units for receiving and retaining a magnetically impressed code including a priority code; magnetic field producing apparatus for recording said code on said metal tabs; first magnetic field detecting apparatus remote from said magnetic field producing apparatus for reading said code recorded on said metal tabs and producing an output signal when a predetermined code has been detected; diverter apparatus responsive to said output signal from said first magnetic field detecting apparatus to divert said material-units bearing said predetermined code from said main route to said first secondary route; code modifying apparatus adjacent to said first secondary route of said conveyor system for modifying said predetermined code in said metal tabs after the necessary function has been performed on said material-units; means including said conveyor system for returning said material-units to said main route after said material units have passed by said code modifying apparatus; order verifier apparatus including magnetic field detecting apparatus remote from said first magnetic field detecting apparatus for reading said code and producing an output signal representative thereof and director apparatus associated therewith responsive to said output signal for directing said material-units to said second secondary route or allowing said material units to remain on said main route; second magnetic field detecting apparatus for reading said priority code remaining in said metal tabs after said material-units have been transported past said order verifier apparatus and producing an output signal representative thereof; mechanism for predetermined disabling of said diverter apparatus and connected thereto, to prevent removal of said material units from said main route to said first secondary route; and diverting override apparatus responsive to said second magnetic field detecting apparatus to cause said diverter apparatus to divert said material-units bearing said code detected by a said second field detecting apparatus onto said first secondary route.

11. Material-unit identifying apparatus in combination with conveyor apparatus for producing a predetermined result comprising: a conveyor system having a primary and a plurality of secondary routes for receiving, discharging, and transporting a plurality of material units; magnetizable material associated with each of said material units for receiving and retaining a distinct magnetically impressed code including a priority code; a plurality of magnetic field producing apparatus for recording said distinct code on each of said magnetizable materials; a first plurality of magnetic field detecting apparatus for reading said code recorded on said magnetizable material and producing output signals when said distinct code associated with each of said material-units has been detected; a plurality of diverters responsive to said output signals from said first magnetic field detecting apparatus to divert at diverse stations each of said material units bearing said distinct code from said primary route to a secondary route; code modifying apparatus associated with each of said secondary routes of said conveyor system for modifying said distinct code after the necessary function has been performed on said material units; means including said conveyor system for returning said material units to said primary route after said material units have passed by said code modifying apparatus; order-verifier apparatus including magnetic field detecting apparatus remote in the direction of travel from said first magnetic field detecting apparatus for reading said code and producing an output signal representative thereof and director apparatus associated therewith responsive to said output signal for directing said material-units to said secondary route or allowing said material-units to remain on said main route; second magnetic field detecting apparatus for reading said priority code existing after said material units have been transported past said order verifier apparatus and producing an output signal representative thereof; a plurality of mechanisms for predetermined disabling of said diverter apparatus and connected thereto, to prevent removal of said material units from said main route to said secondary route; and diverting override apparatus responsive to said second magnetic field detecting apparatus to cause certain of said plurality of diverters to divert said material units bearing said code detected by said second field detecting apparatus onto said secondary route.

12. The invention as set forth in claim 11 including a master code eraser adjacent to the last route of said secondary routes so that all magnetizable material associated with said material units pass thereby to erase any remaining code in said magnetizable material.

References Cited in the file of this patent

UNITED STATES PATENTS

| | | |
|---|---|---|
| 1,983,342 | Chambers | Dec. 4, 1934 |
| 2,043,293 | Jennings | June 9, 1936 |
| 2,063,230 | Crady | Dec. 8, 1936 |
| 2,254,931 | Bryce | Sept. 2, 1941 |
| 2,306,211 | Geiss | Dec. 22, 1942 |
| 2,857,059 | Goerlich | Oct. 21, 1958 |
| 2,877,718 | Mittag | Mar. 17, 1959 |
| 2,900,146 | Hafner | Aug. 18, 1959 |
| 2,974,277 | Wales | Mar. 7, 1961 |
| 2,980,235 | Mittag | Apr. 18, 1961 |

FOREIGN PATENTS

| | | |
|---|---|---|
| 1,158,885 | France | July 20, 1958 |
| 1,014,932 | Germany | Aug. 29, 1957 |

OTHER REFERENCES

"Magnetic Sorting of Unlabeled Food Cans," Gumpertz, Electronics, September 1952 (pages 100–105).

UNITED STATES PATENT OFFICE

Certificate of Correction

Patent No. 3,075,653 January 29, 1963

Donald A. Wales

It is hereby certified that error appears in the above numbered patent requiring correction and that the said Letters Patent should read as corrected below.

In the drawings, Sheets 1, 2, and 3 should be cancelled and Sheets 1, 2, and 3 shown below substituted therefor, as part of the Letters Patent.

Jan. 29, 1963 D. A. WALES ET AL 3,075,653

APPARATUS FOR AND METHOD OF IDENTIFYING MATERIAL UNITS

Filed Dec. 12, 1958 3 Sheets-Sheet 1

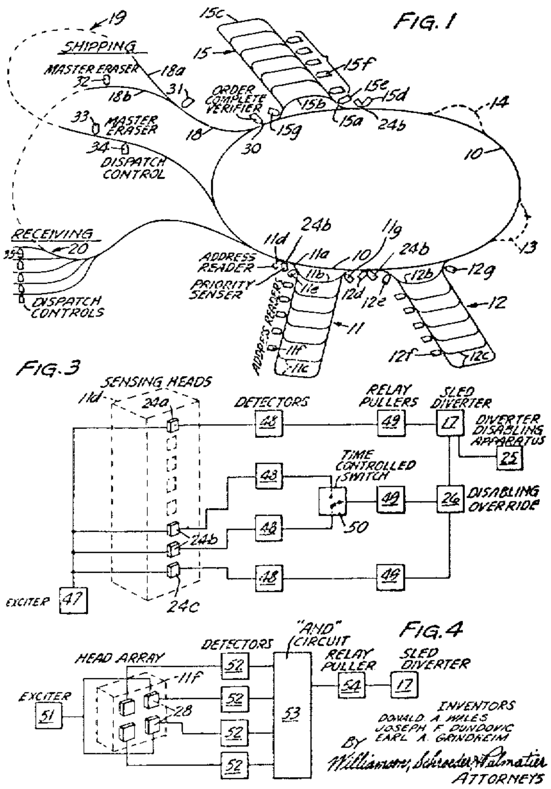

FIG. 1, FIG. 3, FIG. 4

INVENTORS
DONALD A. WALES
JOSEPH F. DUNDOVIC
EARL A. GRINDHEIM
BY Williamson, Schroeder & Palmatier
ATTORNEYS Jan. 29, 1963 D. A. WALES ET AL 3,075,653

APPARATUS FOR AND METHOD OF IDENTIFYING MATERIAL UNITS

Filed Dec. 12, 1958 3 Sheets-Sheet 2

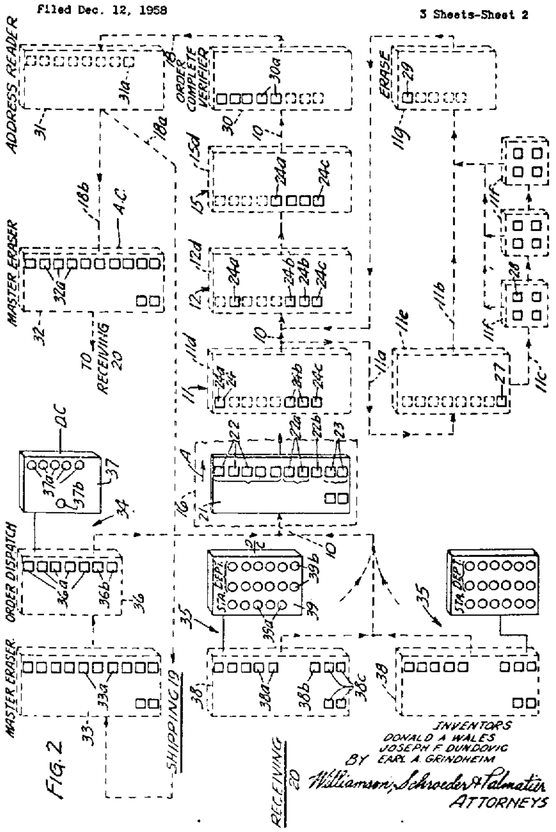

FIG. 2

INVENTORS
DONALD A. WALES
JOSEPH F. DUNDOVIC
EARL A. GRINDHEIM
BY Williamson, Schroeder & Palmatier
ATTORNEYS Jan. 29, 1963 D. A. WALES ET AL 3,075,653

APPARATUS FOR AND METHOD OF IDENTIFYING MATERIAL UNITS

Filed Dec. 12, 1958 3 Sheets-Sheet 3

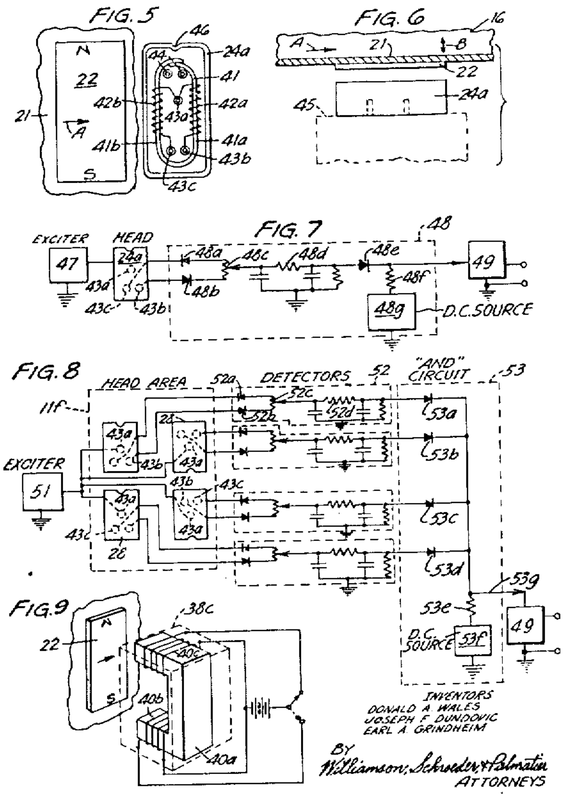

FIG. 5, FIG. 6, FIG. 7, FIG. 8, FIG. 9

INVENTORS
DONALD A. WALES
JOSEPH F. DUNDOVIC
EARL A. GRINDHEIM

BY Williamson, Schroeder & Palmatier
ATTORNEYS

Signed and sealed this 13th day of August 1963.

[SEAL]

Attest:

ERNEST W. SWIDER,
*Attesting Officer.*

DAVID L. LADD,
*Commissioner of Patents.*